United States Patent [19]
Nisley

[11] Patent Number: 5,833,372
[45] Date of Patent: Nov. 10, 1998

[54] AUXILIARY SEAL FOR A BEARING AND BEARING INCORPORATING SUCH A SEAL

[75] Inventor: Donald L. Nisley, Greenville, S.C.

[73] Assignee: Reliance Electric Industrial Company, Cleveland, Ohio

[21] Appl. No.: 867,467

[22] Filed: Jun. 2, 1997

[51] Int. Cl.[6] .............................. F16C 33/78; F16C 33/80
[52] U.S. Cl. .................... 384/477; 277/348; 277/349; 277/419; 384/480; 384/489
[58] Field of Search .................... 384/130, 139, 384/144, 148, 151–153, 477, 480–484, 489; 277/53, 56, 58, 419, 348, 349

[56] References Cited

U.S. PATENT DOCUMENTS

| | | | |
|---|---|---|---|
| 3,113,810 | 12/1963 | Brusca | 384/477 X |
| 3,971,565 | 7/1976 | Schickling et al. | 277/59 |
| 4,881,829 | 11/1989 | Loelsch | 384/480 X |
| 5,174,583 | 12/1992 | Orlowski et al. | 277/56 |
| 5,259,628 | 11/1993 | Nisley | 277/56 X |
| 5,290,047 | 3/1994 | Duffee et al. | 277/53 |
| 5,378,000 | 1/1995 | Orlowski | 277/25 |
| 5,498,006 | 3/1996 | Orlowski | 277/56 X |

*Primary Examiner*—Thomas R. Hannon
*Attorney, Agent, or Firm*—Patrick S. Yoder; John M. Miller; John J. Horn

[57] ABSTRACT

An auxiliary seal for a bearing includes a seal housing supported by the bearing housing, and a seal ring interference fitting around a mechanical element such as a shaft or sleeve supported for rotation by the bearing. The housing and sleeve include a series of rings that interface with one another to maintain the seal ring in place on the mechanical element. A face rubbing seal is supported on the seal ring and contacts a portion of the seal housing as the mechanical element rotates relative to the bearing housing. The seal ring has an integral backup portion which contacts the face rubbing seal to prevent the face rubbing seal from sliding axially away from the seal housing. A series of seal barriers are defined by the seal housing and seal ring, including contact seals, grease dams and labyrinth seals.

24 Claims, 3 Drawing Sheets

AUXILIARY SEAL FOR A BEARING AND BEARING INCORPORATING SUCH A SEAL

BACKGROUND OF THE INVENTION

The present invention relates generally to the field of bearings, such as roller or ball bearings. More particularly, the invention relates to an auxiliary seal for a bearing that permits the seal to be flushed independent of the bearing and that creates an effective barrier preventing dirt and debris from entering into the bearing. The invention also relates to a bearing incorporating such a seal.

A variety of sealing arrangements have been proposed and are currently available for bearing assemblies, such as roller or ball bearings. Such sealing arrangements generally form a barrier between the interior of a housing in which the bearing elements are supported and the ambient environment surrounding the housing, and may incorporate a range of sealing devices within the barrier. Among the useful functions fulfilled by bearing seals are the retention of lubricants within the bearing housing, the exclusion of dirt, debris, moisture or other harmful contaminants from the housing. Bearing sealing arrangements are typically either housing seals, establishing a barrier directly between the bearing housing interior and the ambient environment, or auxiliary seals, designed to create a barrier external to the bearing independent of the bearing housing interior. Auxiliary seals offer certain advantages over housing seals, including their ability to be independently flushed with lubricant. Because such flushing may require considerable lubricant, typically grease, in certain applications, particularly requiring large bearing housings, the use of an auxiliary bearing seal may significantly reduce the amount of lubricant needed for proper maintenance of the bearing and seal. Moreover, flushing may result in heating of the bearing elements, which can be avoided by the use of an auxiliary seal which can be flushed independently.

One difficulty which must be addressed in auxiliary seal design is the provision of an effective seal between the bearing housing or an element attached to the bearing housing and a rotating member supported by the bearing. In a typical application a flanged or pillow block mounted bearing housing, supporting an outer bearing race, is fixed to a machine element, such as a structural frame. An inner bearing race surrounds a rotating shaft (or sleeve) supported by the bearing, and is stationary with respect to the shaft (typically rotating, although in certain applications the shaft or sleeve may be stationary and the housing rotating). An auxiliary seal housing is then fitted to the bearing housing and forms a barrier between the bearing housing and the outer surface of the shaft. In certain known designs a soft rubber seal is tightly fitted around the shaft, rotates with the shaft and contacts a sealing surface of the seal housing. A drawback of such arrangements is that the soft seal may have a tendency to move axially on the shaft due to the pressure it exerts against the seal housing. To remedy this problem, certain designs employ a separate back-up ring fitted to the shaft behind the soft seal, adding to the complexity and the number of separately installed parts in the assembly. In other known designs, a soft seal is supported on the seal housing and contacts the shaft to establish a seal. While this structure eliminates the need for a back-up ring on the shaft, the constant friction of the seal on the shaft may lead to scoring of the shaft, particularly in harsh or abrasive environments.

There is a need, therefore, for an improved auxiliary seal design that provides an effective barrier to dirt, debris and other contaminants, but that avoids the need for a separable back-up ring secured to the shaft, as well as the potential of scoring of the rotating shaft. Moreover, there is a need for an auxiliary seal providing a plurality of barriers within a relatively straightforward structure that is easy to install and service.

SUMMARY OF THE INVENTION

The present invention features an innovative auxiliary seal designed to respond to these needs. The seal includes a seal housing that is fitted to the bearing housing, and a seal ring that fits snugly around a shaft or sleeve supported by the bearing. The seal ring interlocks with a portion of the seal housing to prevent axial movement of the seal ring on the shaft or sleeve. A face-rubbing seal may be supported on the seal ring and is prevented from moving axially by a retaining portion of the seal ring. In addition to the face-rubbing seal, several barriers are preferably established by cooperating surfaces of the seal housing and seal ring, including one or more labyrinth seals and one or more grease dams. A protective shroud or shield may be provided around the seal ring to inhibit damage to the seal ring and race-rubbing seal. The entire seal assembly may be installed as a unit through a simple sequence of steps on one or both sides of a bearing housing.

Thus, in accordance with a first aspect of the invention, an auxiliary seal is provided for a bearing of the type including a housing and a bearing set disposed in the housing for supporting a machine member in rotation with respect to the housing. The seal includes a seal housing and a seal ring. The seal housing is adapted to be sealingly coupled to the bearing housing. The seal housing includes a central aperture for receiving the machine member and a first retaining element projecting radially inwardly. The seal ring is adapted to be sealingly secured around the machine member and to cooperate with the seal housing to establish a seal barrier between the housing and the machine member. The seal ring includes a second retaining element projecting radially outwardly. The second retaining member contacts the first retaining member to limit axial movement of the seal ring on the machine member. A plurality of sealing features are preferably defined between the seal housing and the seal ring. In a particularly preferred embodiment, a sealing element is disposed on the seal ring and contacts the seal housing, while the seal ring includes an abutment member for limiting axial movement of the sealing element.

In accordance with another aspect of the invention, an auxiliary seal for a bearing includes a seal housing, an inner seal ring and an outer seal ring. The seal housing is adapted for coupling to a bearing housing, and includes an inner annular groove, a lubricant injection fitting and an inwardly extending first retaining element. The lubricant injection fitting permits injection of lubricant into the seal housing. The inner seal ring, which is preferably a laminar metallic ring, is adapted to be sealingly secured to the machine member. The inner seal ring is received within the annular groove to establish a labyrinth seal therewith limiting ingress of lubricant injected via the injection fitting into the bearing housing. The outer seal ring is adapted to be sealingly secured to the machine member and cooperates with the seal housing to establish a seal therebetween. The outer seal ring includes a second retaining element extending radially outwardly. The second retaining element cooperates with the first retaining element to limit axial movement of the outer seal ring.

In accordance with still another aspect of the invention, a sealed bearing assembly is provided that includes a bearing housing and a bearing set disposed within an interior cavity of the housing. The bearing set includes an annular interior bearing surface for supporting a machine element in rotation with respect to the bearing housing. An annular seal housing is sealingly supported in the bearing housing, the seal housing including a first retaining element extending radially inwardly. A seal ring is configured to be sealingly fitted around the machine element and cooperates with the seal housing to establish a seal barrier enclosing the interior cavity of the bearing housing. The seal ring includes a second retaining element extending radially outwardly, the first and second retaining elements cooperating to limit axial movement of the seal ring with respect to the seal housing. In a preferred configuration, the bearing housing includes two mating pieces which define, which assembled, an annular groove for receiving and supporting the seal housing.

BRIEF DESCRIPTION OF THE DRAWINGS

The present invention will become more fully understood from the following detailed description, taken in conjunction with the accompanying drawings, wherein like reference numerals refer to like parts, in which.

DETAILED DESCRIPTION OF THE PRESENTLY PREFERRED EMBODIMENTS

Figure 1:
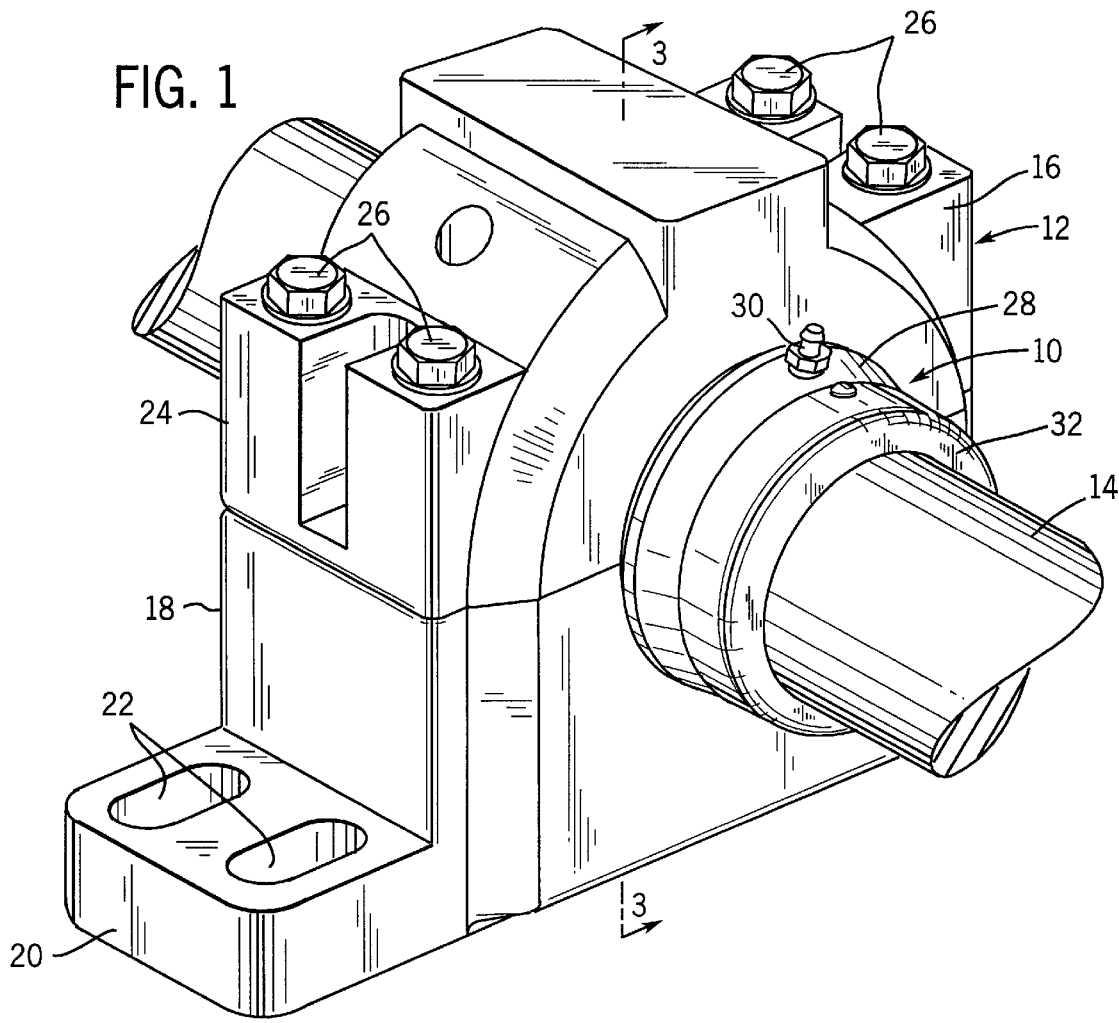
FIG. 1 is a perspective view of a bearing incorporating an auxiliary seal in accordance with the invention.

Turning now to the drawings, and referring first to FIG. 1, an auxiliary seal 10 is illustrated coupled to a bearing assembly 12 for supporting a shaft 14 in rotation. As illustrated in FIG. 1, bearing assembly 12 includes a bearing housing 16 of a split-cap design. Thus, bearing housing 16 includes a pillow block 18 having lateral flanges 20 with bolt holes 22 for securing pillow block 18 to a machine surface (not represented). A separable cap 24 fits over pillow block 18 and is secured to pillow block 18 by bolts 26 during assembly of auxiliary seal 10 and bearing assembly 12 as described in greater detail below. It should be noted that, while through the following discussion, reference is made to support and sealing around a shaft 14, auxiliary seal 10 may be used in conjunction with other rotating machine elements including sleeves and the like, such as may be utilized on gear reducers, conveyors and other industrial equipment. It should also be noted that while references made to a split-cap pillow block-type bearing housing, auxiliary seal 10 may be adapted for use on a variety of other bearing housing structures, including 2-bolt flanged housings and 4-bolt flanged housings. Finally, throughout the following discussion, while reference is made to only one auxiliary seal assembly positioned on one side of bearing assembly 12, those skilled in the art will appreciate that the bearing assembly may accommodate machine elements extending completely therethrough, with similar auxiliary seals positioned on either side of the bearing assembly.

Figure 2:
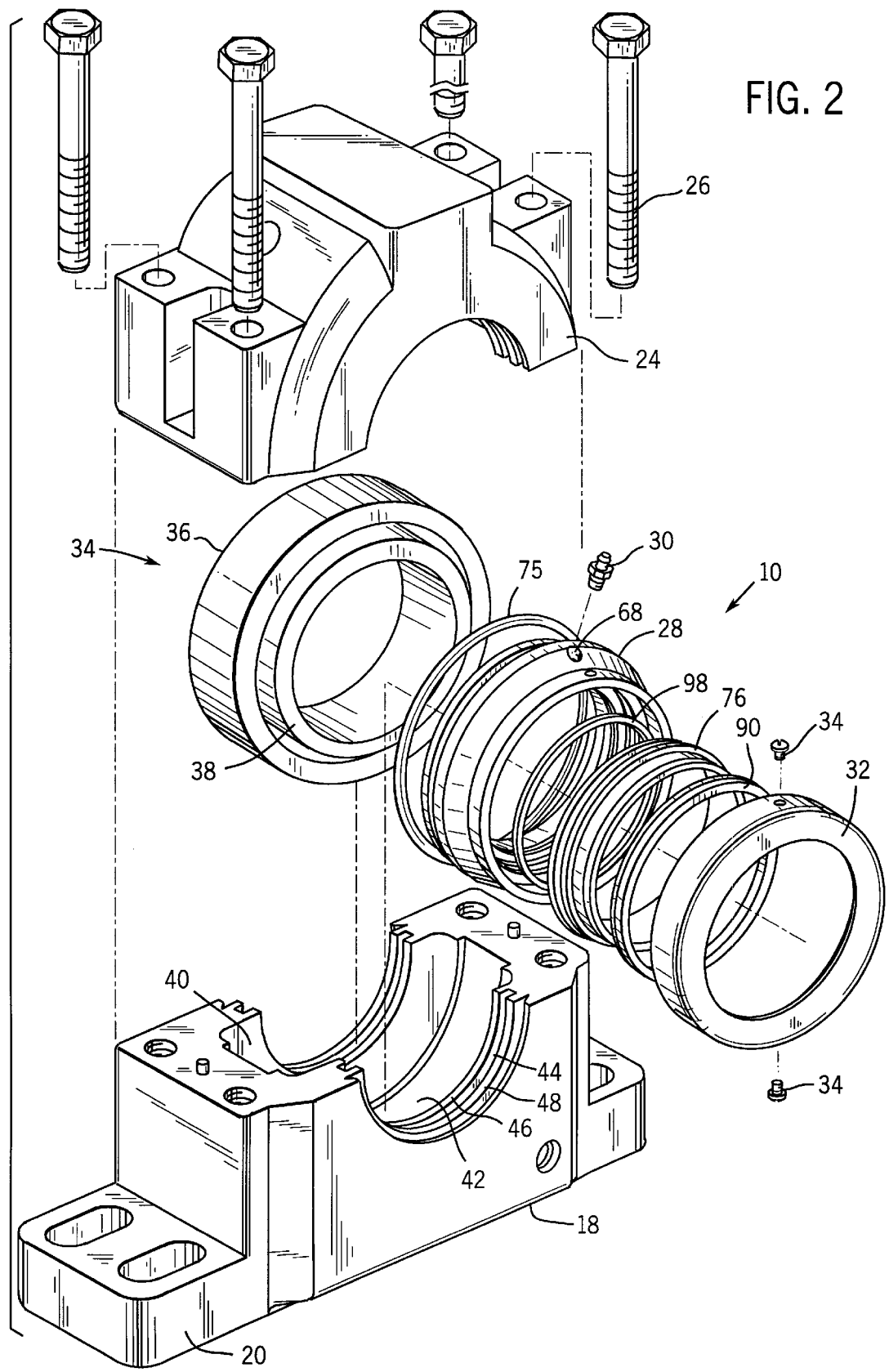
FIG. 2 is an exploded perspective view of the bearing and seal of FIG. 1, illustrating the basic components of the seal in accordance with a particularly preferred embodiment.

Turning more particularly to the preferred construction of auxiliary seal 10, as shown in FIGS. 1 and 2, seal 10 includes a sealed housing 28, of generally annular shape for supporting various seal rings and for interfacing with corresponding features of bearing housing 16 as described below. A lubricant injection fitting 30 is accessible from outside seal housing 28 after a full assembly of the seal with the bearing assembly for flushing and lubricating seal 10. Also as illustrated in FIG. 1, a shield 32 is preferably secured to seal housing 28 to protect the components of the seal. These components will be more fully described below with reference to FIG. 3.

As best illustrated in FIG. 2, bearing assembly 12 includes a bearing set 34 which may be of any known type, such as a tapered roller bearing, straight roller bearing, ball bearing and the like. Bearing set 34 includes an outer ring or race 36, and an inner ring or race 38 between which are disposed rotating bearing elements (not illustrated). Bearing set 34 is positioned and secured in a conforming internal cavity of 40 formed within bearing housing 16. Walls of housing 16 surround the internal cavity 40 support bearing set 34 both axially and radially when bearing assembly 12 is fully assembled and in use. Bearing housing 16 includes a side aperture 42 through which shaft 14 extends when assembled. A similar aperture 42 may be formed in a rear end of bearing housing 16, thereby permitting shaft 14 to extend entirely through assembly 12 as mentioned above. An auxiliary seal support groove 44 is formed around a periphery of aperture 42. While various attachment and support structures for auxiliary seal 10 will be envisioned by those skilled in the art, in the presently preferred embodiment illustrated, auxiliary seal support groove 44 is bounded by a rear annular wall 46 and a front annular wall 48 between which a portion of sealed housing 28 is fitted as described below.

Figure 3:
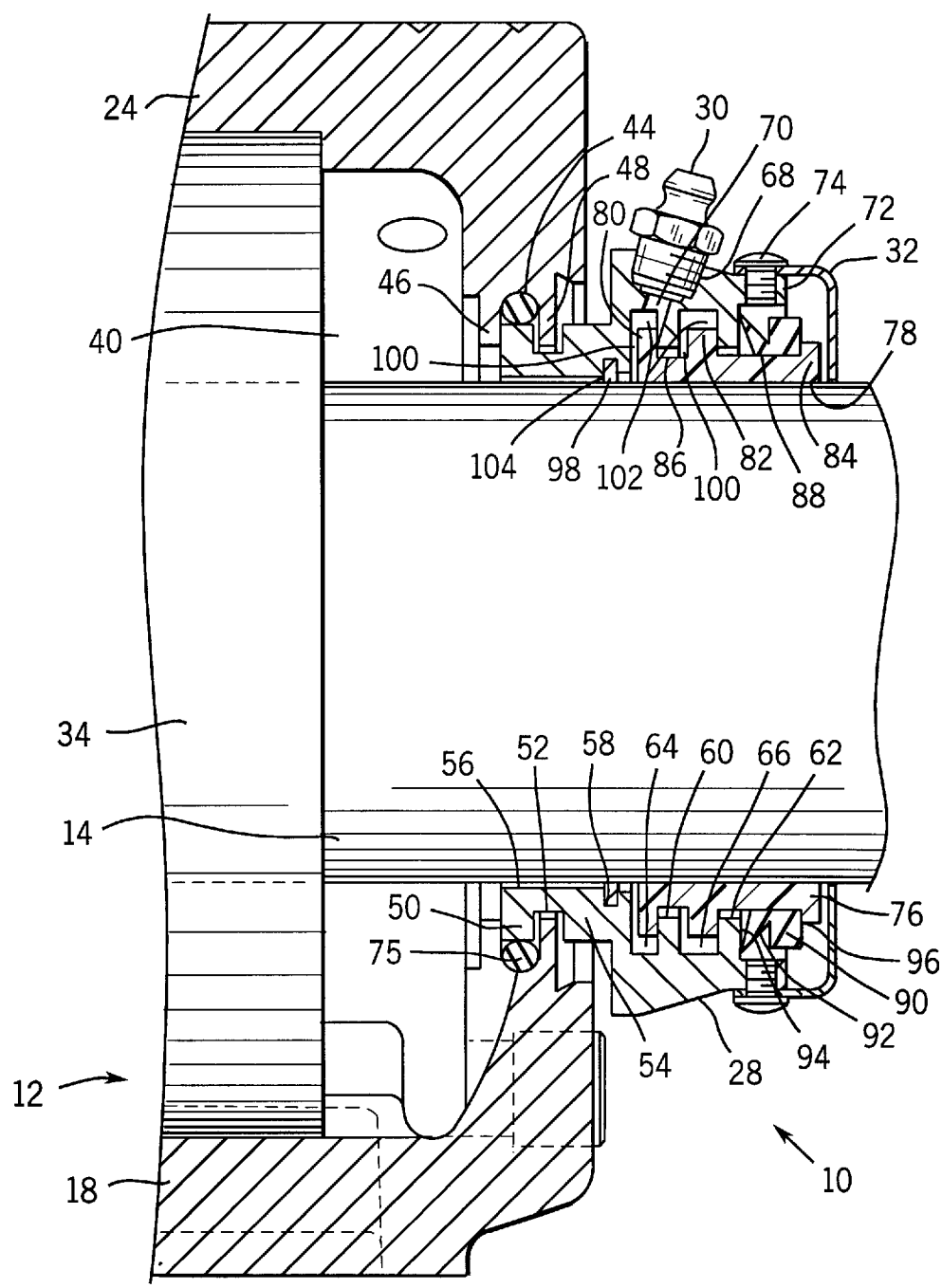
FIG. 3 is a sectional side view of the bearing and seal of FIG. 1, illustrating the components shown in FIG. 2 as they would be positioned in the assembled seal.

As best shown in FIG. 3, seal housing 28 includes a number of features permitting auxiliary seal 10 to be secured to bearing housing 16 and forming a barrier between internal cavity 40 and the ambient surroundings of the bearing assembly. In particular, seal housing 28 includes an annular rear extension 50 bounding a rear, radially outwardly-facing groove 52. A rear body portion 54 bounds an axial front side of rear groove 52, permitting seal housing 28 to be secured to bearing housing 16. A cylindrical inner annular surface 56 is formed along a section of seal housing 28 extending from rear extension 50 along the length of rear groove 52 and rear body 54 for forming a labyrinth barrier adjacent to internal cavity 40 when seal 10 is assembled around shaft 14. In addition, an inner ring groove 58 is formed along the inner surface of seal housing 28 at a front boundary of annular surface 56. Axially outboard of these features, a pair of radially inwardly projecting rings 60 and 62 are integrally formed on seal housing 28. Between a first of these rings 60 and rear body 54, a first outer groove 64 is formed, while in a space between rings 60 and 62 a second outer groove 66 is defined. A threaded fitting port 68 is provided in seal housing 28 at a bottom of which is formed a lubricant channel 70 in a fluid communication with first outer groove 64. Threaded fitting port 68 receives and seats with lubricant injection fitting 30 when auxiliary seal 10 is assembled. Finally, one or more threaded shield support holes 72 are provided in locations around the periphery of seal housing 28 for receiving bolts or screws 74 for securing shield 32 to the outboard end of seal housing 28.

Seal housing 28 is thus configured for securing to bearing housing 16 and for forming a barrier between cavity 14 and the ambient surroundings of the bearing assembly. A friction and sealing ring 75 is interposed between the base of groove 44 and rear extension 50 of seal housing 28. Seal housing 28 may be easily secured to the bearing housing with rear extension 50 positioned between wails 46 and 48 bounding groove 44, thereby limiting axial movement of seal housing 28 while permitting some freedom of movement by virtue of ring 44. Ring 44 is preferably made of an elastic moldable material, such nitrile rubber.

A seal ring 76 interfaces with seal housing 28 to define a series of sealing structures between cavity 40 and the ambient surroundings of the bearing assembly. As best illustrated in FIG. 3, in the presently preferred embodiment seal ring 76 has an inner surface 78 sized to fit tightly (i.e. an interference fit) around shaft 14 when installed. Seal ring 76 also includes a series of radially outwardly projecting rings 80, 82 and 84, with rings 80 and 84 bounding rear and front edges of seal ring 76 respectively. An inner groove 86 is defined between rings 80 and 82, while an outer groove 88 is defined between rings 82 and 84. When assembled with seal housing 28 as shown in FIG. 3, the rear-most ring 80 of seal ring 76 enters into groove 64 of seal housing 28, while ring 82 of seal ring 76 enters into groove 66 of seal housing 28. Similarly, inwardly projecting ring 60 of seal housing 28 is interposed between outwardly projecting rings 80 and 82 of seal ring 76. In the presently preferred embodiment, seal housing 28 is cast and machined in metal, such as aluminum or steel, while seal ring 76 is made of a relatively flexible, moldable plastic material such as polyurethane. Thus, seal ring 76 may be easily assembled with seal housing 28 by deforming seal ring 76 sufficiently to force rings 80 and 82 into the mating relationship with rings 60 and 62 described above. Once the seal ring is thus inserted into seal housing 28, it assumes its original shape, forming a unified structure with seal housing 28.

A face-rubbing seal 90, preferably in the form of a separable, rubber V-ring, is secured within outer groove 88 of seal ring 76. Seal 90 includes a flexible extension 92 directed toward seal housing 28. Flexible extension 92 rides on and rubs against a seal surface 94 formed on an outer face of ring 62. As will be appreciated by those skilled in the art, rings 80 and 82 of seal ring 76, and rings 60 and 62 of seal housing 28 are preferably narrower than the grooves into which they enter when assembled. Thus, flexible extension 92 riding against seal surface 94 will have a tendency to urge seal ring 76 to an axially outwardly shifted position wherein one or more sets of rings (80 and 60, 82 and 62) will contact one another to permit flexible extension 92 to exert a light pressure against seal surface 94. A base 96 of seal 90 abuts outer-most ring 84 of seal ring 76 to limit axial movement of seal 90 when installed. Thus, the preferred structure illustrated eliminates the need for a separable back-up ring behind seal 90.

In addition to seal housing 28, seal ring 76 and seal 90, auxiliary seal 10 preferably includes an inner seal ring 98 fitted tightly (i.e. in a slip fit) around shaft 14 when installed. Seal 98 fits within inner ring groove 58 of seal housing 28. In the presently preferred embodiment, inner seal ring 98 is a spiral laminar metallic ring which is preassembled with seal housing 28 by flexing ring 98 slightly to snap it into engagement with groove 58.

Auxiliary seal 10, including the components described above, is preferably pre-assembled for installation within bearing assembly 12 and around shaft 14 as follows. First, inner seal ring 98 is snapped into inner ring groove 58 and seal ring 76 is deformed slightly to enter into engagement with seal housing 28 as described above. Next, face rubbing seal 90 is expanded and fitted into outer groove 88 of inner seal 78. Finally, lubricant injection fitting 30 is screwed into fitting port 68 and shield 32 is affixed to seal housing 28 by screws 74. For assembly with shaft 14 and bearing assembly 12, the completed auxiliary seal assembly is first slid over an end of shaft 14 and positioned over bearing housing 16. Shaft 14 and seal 10 are then lowered into the bearing housing, with rear extension 50 of seal housing 28 being positioned in groove 44, friction ring 75 having been pre-positioned within groove 44. It should be noted that during this assembly, seal ring 76 and inner seal ring 98 will be fitted snugly around shaft 14. Bearing set 34 is then positioned along shaft 14 in a conventional manner and the bearing housing 16 may be closed and secured around shaft 14. In other bearing housing styles, such as 2 and 4 bolt flanged housings, seal 10 may be preassembled with the bearing assembly and the entire structure slid into place over shaft 14.

Once assembled in bearing housing 16 and around shaft 14, seal 10 advantageously provides a series of sealing structures between cavity 40 and the ambient surroundings of the bearing assembly. In particular, at least five sequential sealing arrangements are preferably provided in the structure. First, face rubbing seal 90 provides a mechanical contact seal against seal surface 94 of seal housing 28. In use, because seal ring 76 will rotate with shaft 14, a dynamic seal is thus established between face-rubbing seal 90 and seal housing 28. A contact seal is also established due to the interference fit between seal ring 76 and the outer surface of shaft 14. Moreover, labyrinth seals 100 are preferably defined between outwardly projecting rings 80 and 82 of seal ring 76 and the walls of seal housing 28 surrounding grooves 64 and 66. The regions surrounding rings 80 and 82 also defined cavities 102 in which grease dams are established following insertion of a lubricant grease into seal housing 28. These grease dams preferably substantially fill cavities 102 and extend up to inner ring 98. A further close-running labyrinth seal 104 is established in a region surrounding inner ring 98.

As will be appreciated by those skilled in the art, once installed, auxiliary seal 10 can be lubricated and maintained in a straight-forward manner by maintenance personnel by injecting a lubricant grease through lubricant injection fitting 30. The lubricant thus injected will flow into cavities 102 and surround inner ring 98, being generally prevented from entering cavity 40 by ring 98 and by close running tolerances between inner annular surface 56 and shaft 14. The features of auxiliary seal permit lubricant to flow into cavities 102 and out through the interface between face-rubbing seal 90 and seal surface 94, deforming flexible extension 92. The bearing is completely flushed by monitoring the flow of lubricant exiting the clearance space between shield 32 and shaft 14.

While the embodiments illustrated in the Figures and described above are presently preferred, it should be understood that these embodiments are offered by way of example only and may be adapted to various other structures.

What is claimed is:

1. An auxiliary seal for a bearing, the bearing including a housing and a bearing set disposed in the housing for supporting a machine member in rotation with respect to the housing, the seal comprising:

a seal housing adapted to be sealingly coupled to the bearing housing, the seal housing including a central aperture for receiving the machine member and a first retaining element projecting radially inwardly;

a seal ring adapted to be sealingly secured around the machine member and to cooperate with the seal housing to establish a seal barrier between the housing and the machine member, the seal ring including a second retaining element projecting radially outwardly, the second retaining member contacting the first retaining member to limit axial movement of the seal ring of the machine member, the seal ring defining with the seal housing an annular void for retaining lubricant; and an inner seal ring disposed between the annular void and the bearing set when the seal is installed in the bearing housing, the inner seal ring establishing a labyrinth seal with the seal housing for limiting ingress of lubricant into the bearing housing from the annular void.

2. The auxiliary seal of claim 1, wherein the seal ring is made of a moldable plastic material which is deformed to interlock the first and second retaining elements.

3. The auxiliary seal of claim 1, further comprising a flexible sealing element supported on the seal ring, the flexible sealing element contacting the seal housing to establish a barrier therebetween.

4. The auxiliary seal of claim 3, wherein the seal ring includes an abutment member and the flexible sealing element fits against the abutment member to limit axial movement of the sealing member on the seal ring.

5. The auxiliary seal of claim 1, wherein the seal ring includes a first annular ring extending radially outwardly and the seal housing includes a second annular ring extending radially inwardly, the first and second annular rings cooperating to define a labyrinth seal therebetween.

6. The auxiliary seal of claim 1, further comprising a lubricant injection fitting secured to the seal housing for injecting lubricant into the annular void.

7. The auxiliary seal of claim 1, wherein the seal ring includes a first annular ring extending radially outwardly and the seal housing includes a second annular ring extending radially inwardly, the first and second annular rings cooperating to define the annular void for retaining lubricant.

8. The auxiliary seal of claim 1, wherein the inner seal ring includes a metallic ring slip fit to the mechanical member.

9. The auxiliary seal of claim 1, further comprising a shield secured to the seal housing, the shield substantially surrounding the seal ring.

10. An auxiliary seal for a bearing, the bearing including a housing and a bearing set disposed in the housing for supporting a machine member in rotation with respect to the housing, the seal comprising:

a seal housing adapted for coupling to the bearing housing, the seal housing including an inner annular groove, a lubricant injection fitting and a first retaining element, the lubricant injection fitting permitting injection of lubricant into the seal housing, the first retaining element extending radially inwardly;

an inner seal ring adapted to be sealingly secured to the machine member, the inner seal ring being received within the annular groove to establish a labyrinth seal therewith limiting ingress of lubricant injected via the injection fitting into the bearing housing; and an outer seal ring adapted to be sealingly secured to the machine member and cooperating with the seal housing to establish a seal therebetween, the outer seal ring including a second retaining element extending radially outwardly, the second retaining element cooperating with the first retaining element to limit axial movement of the outer seal ring.

11. The auxiliary seal of claim 10, wherein the inner seal ring is a laminar metallic ring slip fit to the mechanical member.

12. The auxiliary seal of claim 10, further comprising a flexible sealing element supported on the outer seal ring, the flexible sealing element contacting the seal housing to establish a barrier therebetween.

13. The auxiliary seal of claim 12, wherein the outer seal ring includes an abutment member and the flexible sealing element fits against the abutment member to limit axial movement of the sealing member on the outer seal ring.

14. The auxiliary seal of claim 10, wherein the outer seal ring includes a first annular ring extending radially outwardly and the seal housing includes a second annular ring extending radially inwardly, the first and second annular rings cooperating to define a labyrinth seal therebetween.

15. A sealed bearing assembly comprising:

a bearing housing including an interior cavity;

a bearing set disposed within the interior cavity, the bearing set including an annular interior bearing surface for supporting a machine element in rotation with respect to the bearing housing;

an annular seal housing sealingly supported in the bearing housing, the seal housing including a first retaining element extending radially inwardly;

a seal ring configured to be sealingly fitted around the machine element, the seal ring cooperating with the seal housing to establish a seal barrier enclosing the interior cavity, the seal ring including a second retaining element extending radially outwardly, the first and second retaining elements cooperating to limit axial movement of the seal ring with respect to the seal housing, the seal ring defining with the seal housing an annular void for retaining a lubricant; and an inner seal ring disposed between the annular void and the bearing set, the inner seal ring establishing a labyrinth seal with the seal housing for limiting ingress into the bearing housing of lubricant from the annular void.

16. The bearing assembly of claim 15, wherein the bearing housing includes first and second housing elements, the first and second housing elements being configured to be secured to one another to enclose the interior cavity, a portion of the first and second housing elements defining an annular groove for sealing receiving the seal housing.

17. The bearing assembly of claim 15, further comprising a lubricant injection fitting secured to the seal housing for injecting lubricant into the annular void.

18. The bearing assembly of claim 15, wherein the seal ring includes a first annular ring extending radially outwardly and the seal housing includes a second annular ring extending radially inwardly, the first and second annular rings cooperating to define the annular void for retaining lubricant.

19. The bearing assembly of claim 15, wherein the inner seal ring includes a metallic ring slip fit to the mechanical member.

20. The bearing assembly of claim 15, wherein the seal ring is made of a moldable plastic material which is deformed to interlock the first and second retaining elements.

21. An auxiliary seal for a bearing, the bearing including a housing and a bearing set disposed in the housing for supporting a machine member in rotation with respect to the housing, the seal comprising:

a seal housing adapted to be sealingly coupled to the bearing housing, the seal housing including a central aperture for receiving the machine member and a first retaining element projecting radially inwardly;

a seal ring adapted to be sealingly secured around the machine member and to cooperate with the seal housing to establish a seal barrier between the housing and the machine member, the seal ring including a second retaining element projecting radially outwardly, the second retaining member contacting the first retaining member to limit axial movement of the seal ring of the machine member; and a protective shield removably secured to the seal housing and extending over the seal ring.

22. The auxiliary seal of claim 21, wherein the seal ring includes a seal riding against a portion of the seal housing during rotation of the machine member, and wherein the protective shield covers the seal when installed on the seal housing and is removable for servicing of the seal.

23. The auxiliary seal of claim 21, wherein the protective shield is a single piece annular member.

24. The auxiliary seal of claim 21, wherein the protective shield is removably secured to the seal housing by at least one threaded fastener.

* * * * *